March 1, 1960     G. A. LYON     2,926,953
WHEEL COVER WITH WEIGHT RETAINING CLIP
Filed Oct. 4, 1955
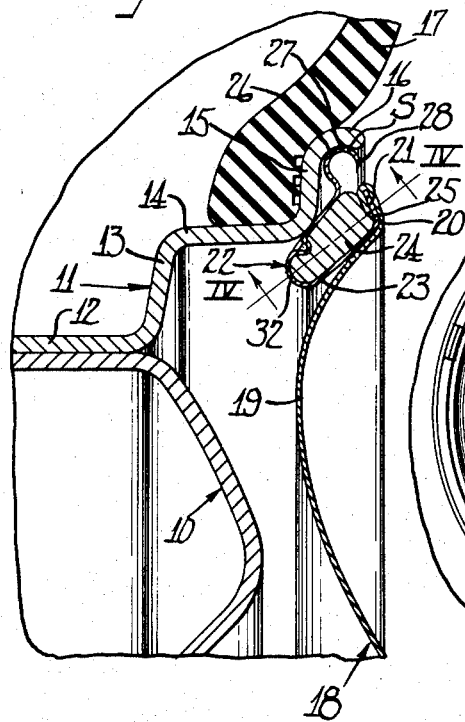
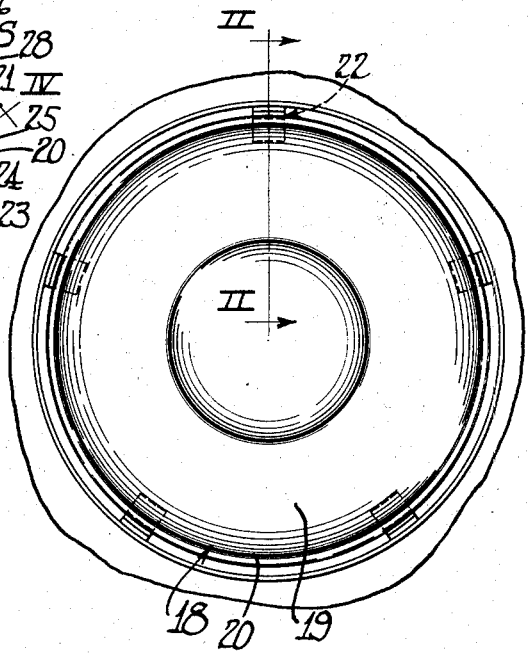
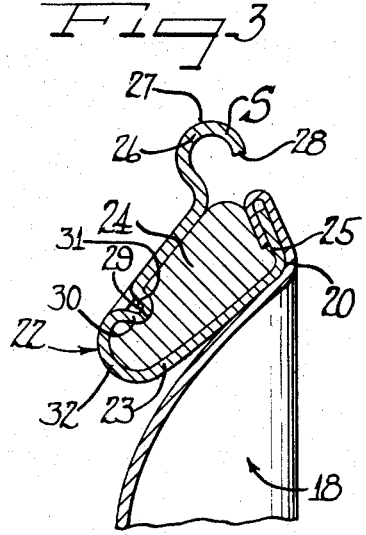
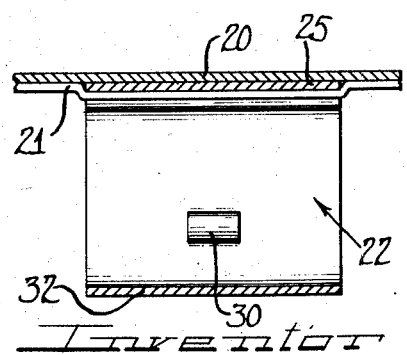
Inventor
George Albert Lyon

United States Patent Office

2,926,953
Patented Mar. 1, 1960

2,926,953

WHEEL COVER WITH WEIGHT RETAINING CLIP

George Albert Lyon, Detroit, Mich.

Application October 4, 1955, Serial No. 538,307

6 Claims. (Cl. 301—5)

This invention relates generally to wheel structures and more particularly to novel retaining clips for maintaining the cover upon the outer side of a wheel.

The present invention concerns itself with the provision of retaining clips having a looped portion defining a housing capable of carrying a wheel balancing weight and having a hooked terminal for snap-on, pry-off engagement upon a wheel. It will be appreciated that this structure is highly advantageous especially since separate clips will not be necessary to maintain the wheel balancing weights upon the wheel as is common practice today. In other words, the same clip that maintains the cover upon the wheel is also utilized to carry wheel balancing weights where needed.

Accordingly, it is an object of this invention to provide a new and improved retaining clip construction.

Another object of this invention is to provide a new improved manner of retaining a cover upon a wheel.

A further object of this invention is to provide a new and improved structure for carrying a wheel balancing weight upon a wheel.

Yet another object of this invention relates to a retaining clip and cover construction which lends itself to economical production on a large production basis.

According to the general features of the invention there is provided in a wheel structure including a wheel having rim and body parts, a cover for overlying disposition upon the wheel having a plurality of circumferentially spaced retaining clips with at least one of the clips having a looped portion extending from the cover and a free terminal having an engaging surface capable of snap-on, pry-off engagement upon the wheel, said looped portion defining a housing capable of receiving a wheel balancing weight therein, a wheel balancing weight in the housing, the terminal portion flexing at its junction with the looped portion upon application of the cover to the wheel with the wheel balancing weight acting as a back-up for the engaging surface in assembly.

Another feature of this invention relates to the provision of locking means for interlocking a wheel balancing weight in a housing provided on a retaining clip.

Other objects and features of this invention will more fully appear from the following detailed description taken in connection with the accompanying drawing which illustrates a single embodiment thereof and in which:

Figure 1 is a front elevation of a wheel structure showing in dotted lines my novel retaining clips;

Figure 2 is an enlarged fragmentary cross sectional view taken substantially on the line II—II of Figure 1 looking in the direction indicated by the arrows;

Figure 3 is an enlarged fragmentary cross sectional view similar to Figure 2 showing in greater detail the features of the present invention; and Figure 4 is an enlarged fragmentary cross sectional view taken substantially on the line IV—IV of Figure 2 looking in the direction indicated by the arrows.

As shown on the drawings:

A vehicle wheel with which the present invention is adapted to be used may be more or less of the conventional type including a wheel body part 10 and a tire rim part 11. The wheel body may be formed as a sheet metal pressed member including the usual dished bolt-on flange (not shown). This bolt-on flange may be secured in any suitable manner upon the axle of the wheel by bolts or the like. The tire rim 11 includes an attachment flange 12 which may be welded or otherwise secured to the body part 10, a generally radially outwardly extending rim flange 13, a generally axially outwardly extending rim flange 14, a generally radially outwardly extending flange 15, and terminating in a generally axially outwardly extending terminal flange 16. It will be noted that terminal flange 16 is of an arcuate cross section configuration which more or less provides a shoulder for purposes that will hereinafter become apparent.

Carried upon the tire rim 11 is a customary vehicle tire 17 which may be either of the tube or tubeless type and may be inflated by a valve stem (not shown).

Cooperable with the wheel in overlying disposition is my novel cover 18 having a dished intermediate portion 19, an outer annular margin 20 with a curled under terminal flange 21.

At the outer margin of the cover 18 it will be noted that there is provided a plurality of circumferentially spaced retaining clips 22 which are an important part of my invention.

Each of the clips 22 has a looped portion 23 defining a housing capable of receiving therein a wheel balancing weight 24. The looped portion 23 has at one end an attachment flange 25 which is adapted to be interlocked between the outer margin of the cover 20 and the underturned flange 21. This may be done in any suitable manner. Connected at the other end of the looped portion 23 is a generally axially outwardly opening terminal or hooked end or portion or channeled portion 26 having an engaging surface 27 terminating in a terminal 28. The terminal 28 may be used as a pry-off edge upon which the clips may be disengaged from the cover.

It will be noted that the wheel balancing weight has a slight depression 29 therein capable of receiving a struck-out locking tab 30 therein. The recess or depression 29 has shoulders 31 which the tab may bear against, in order to insure against displacement of the weight when it is assembled with the clip 22.

The cover and clip assembly may be mounted on the wheel by initially centering the cover 18 with respect to the wheel and thereafter progressively camming hooked end or channelled portion 26 against rim flange 16 until the engaging surface 27 is positively lodged behind shoulders.

Very often when a wheel is being balanced there is required at least a few weights 24 at certain intervals. Accordingly if weights are to be used the weights will have to be assembled with the clips 22 before the assembly is mounted on the wheel. In order to effect this, the user may exert a slight divergent pressure upon the hooked end 26 thereafter slipping the weight into interlocked engagement with tab 30 locked in depression 29.

The instant clip construction is particularly made so that when a wheel balancing weight 24 is inserted into the housing defined by looped portion 23 it will serve as a back-up for the engagement of the hooked portion 26 upon the wheel. In other words, the clips 22 having wheel balancing weights therein will flex in a slightly different manner than those clips that do not have weights therein. To this end, the clips having weights therein will flex at the junction of the hooked portion 26 with looped portion 23. Conversely, those clips not having weights therein are especially adapted to flex at the base 32 or looped portion 23. Hence it will be appreciated that there is greater flexibility in the clip without the wheel balancing weight therein as contrasted to when a weight is housed within the looped portion 23.

When each of the clips 22 carrying the weights 24 are under load of assembly it will be appreciated that the retaining action between the hooked end 26 and rim flange 16 will serve to augment and enhance the overall retaining action of resilient looped portion 23 upon the weights 24.

Removal of the cover may be effected by inserting a suitable pry-off tool underneath the outer margin 20 of the cover and upon the levering of a suitable pry-off force the engaging surface 27 of clip 22 may be disengaged from behind shoulder S. It will also be appreciated that the pry-off tool may be engaged beneath terminal edge 28 and upon the application of a suitable pry-off force the cover may be ejected from the wheel.

It will be understood that modifications and variations may be effected without departing from the scope of the novel concepts of the present invention.

I claim as my invention:

1. In a wheel structure including a wheel having rim and body parts including a curved terminal rim flange, a cover for overlying disposition upon the wheel having a plurality of circumferentially spaced retaining clips with at least one of the clips having a looped portion extending from the cover and a rounded hook-like free terminal having a rounded engaging surface capable of snap-on, pry-off nested engagement with the curved terminal rim flange, said looped portion defining a housing capable of receiving a wheel balancing weight herein, a wheel balancing weight in said housing, said terminal portion flexing at its junction with said looped portion upon application of the cover to said wheel with the wheel balancing weight acting as a back-up for said engaging surface in assembly.

2. In a wheel structure including a wheel having rim and body parts, a circular cover member for overlying disposition upon the wheel having circumferentially spaced spring clips extending therefrom capable of retaining cooperation with said wheel, each of said clips having a looped portion defining a housing capable of receiving a wheel balancing weight therein, a pry-off leg connected to said looped portion and extending outwardly from the wheel and with the wheel engaging surface for snap-on, pry-off engagement with said wheel, said clip having locking means to prevent a wheel balancing weight from falling out of said housing when assembled therein, a wheel balancing weight removably carried by said looped portion, said locking means comprising a struck-out tab being lodged in a corresponding recess in the wheel balancing weight.

3. In a wheel structure including a wheel having rim and body parts, a cover for overlying disposition upon the wheel having a plurality of circumferentially spaced retaining clips with at least one of the clips having a looped portion extending from the cover and a free terminal having an engaging surface capable of snap-on, pry-off engagement upon the wheel, said looped portion defining a housing capable of receiving a wheel balancing weight therein, a wheel balancing weight in said housing, said terminal portion flexing at its junction with said looped portion upon application of the cover to said wheel with the wheel balancing weight acting as a back-up for said engaging surface in assembly, said cover having an outer cover margin spaced from the wheel and radially inwardly of said engaging surface on said clip and with said free terminal extending away from the wheel beyond its engaging surface providing a pry-off tip enabling a pry-off tool to be engaged behind said tip and fulcrumed on said outer cover margin to release the clip from retaining engagement with the wheel, said free terminal comprising a hooked end opening generally outwardly and away from the tire rim and with the rounded hooked end.

4. In a wheel structure including a wheel having rim and body parts, a circular cover member for overlying disposition upon the wheel having circumferentially spaced spring clips extending therefrom capable of retaining the cover member on said wheel, a wheel balancing weight carried by one of said clips, each of said clips having a looped portion defining a housing capable of retaining said wheel weight therein, an arcuate terminal pry-off leg connected to said looped portion and extending outwardly from the wheel, the clip having a wheel engaging surface for snap-on, pry-off engagement with said wheel, said arcuate terminal leg flexing at its junction with said looped portion when engaged upon said wheel when said looped portion has said wheel balancing weight in its housing.

5. In a wheel structure including a wheel having rim and body parts, a circular cover member for overlying disposition upon the wheel having circumferentially spaced spring clips extending therefrom capable of retaining the cover member on said wheel, a wheel balancing weight carried by one of said clips, each of said clips having a looped portion defining a housing capable of retaining said wheel weight therein, an arcuate terminal pry-off leg connected to said looped portion and extending outwardly from the wheel, the clip having a wheel engaging surface for snap-on, pry-off engagement with said wheel, said arcuate terminal leg flexing generally at the base of said looped portion when said housing is empty.

6. In a wheel structure including a wheel having rim and body parts, a circular cover member for overlying disposition upon the wheel having circumferentially spaced spring clips extending therefrom capable of retaining the cover member on said wheel, a wheel balancing weight carried by one of said clips, each of said clips having a looped portion defining a housing capable of retaining said wheel weight therein, a pry-off leg connected to said looped portion and extending outwardly from the wheel, the clip having a wheel engaging surface for snap-on, pry-off engagement with said wheel, said clip having locking means to prevent said wheel balancing weight from falling out of said housing when assembled therein.

References Cited in the file of this patent

UNITED STATES PATENTS

| | | |
|---|---|---|
| 2,404,389 | Lyon | July 23, 1946 |
| 2,443,627 | Lyon | June 22, 1948 |
| 2,522,039 | Jacobsen et al. | Sept. 12, 1950 |
| 2,654,637 | Lyon | Oct. 6, 1953 |